(No Model.)
G. W. THISSELL.
CODDLING MOTH TRAP AND TREE PROTECTOR.
No. 265,718. Patented Oct. 10, 1882.
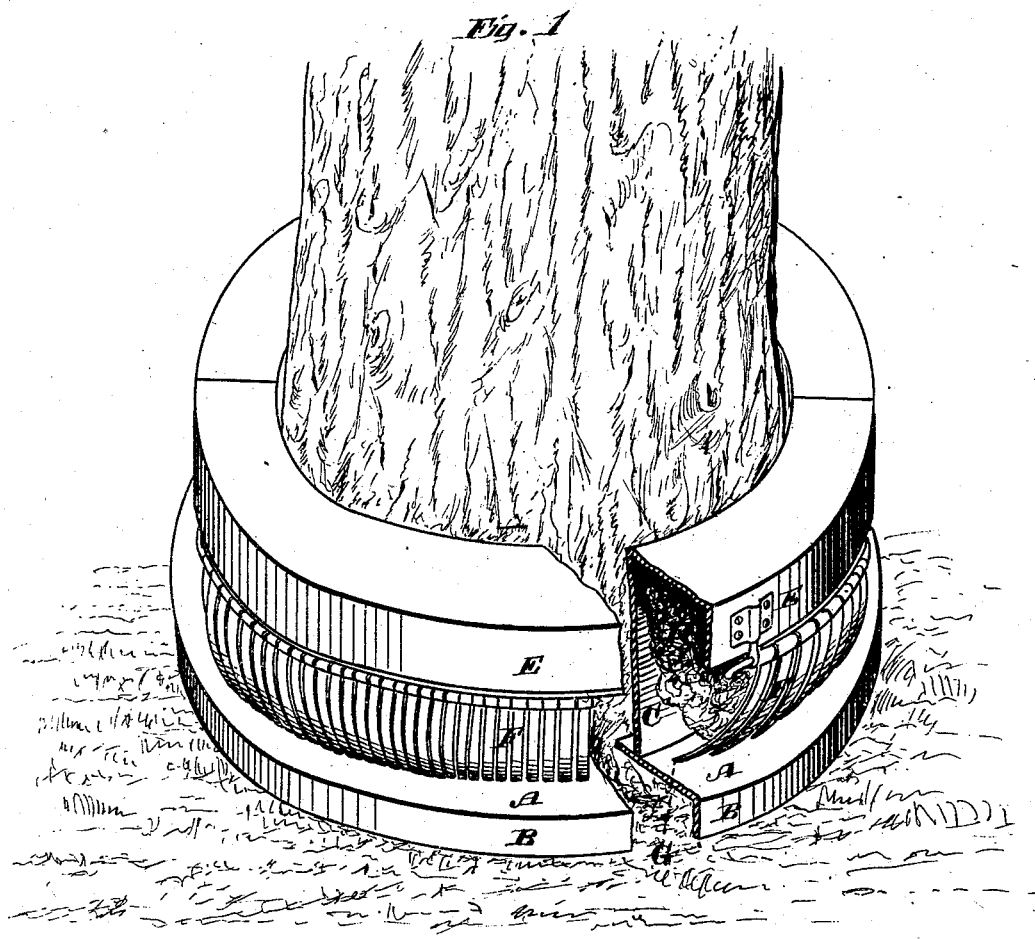
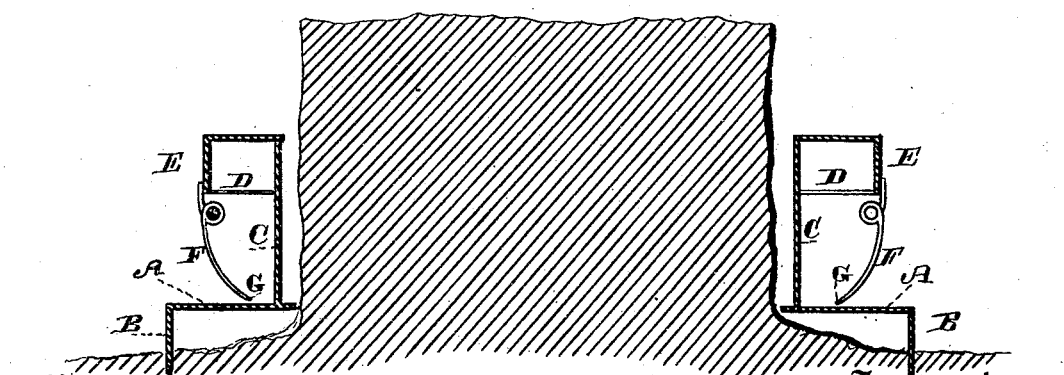
Witnesses:
Geo. H. Strong
J. H. Strouse
Inventor,
Geo. W. Thissell
By Dewey & Co.
Attorneys

UNITED STATES PATENT OFFICE.

GEORGE W. THISSELL, OF WINTERS, CALIFORNIA.

CODDLING-MOTH TRAP AND TREE-PROTECTOR.

SPECIFICATION forming part of Letters Patent No. 265,718, dated October 10, 1882.

Application filed June 12, 1882. (No model.)

*To all whom it may concern:*

Be it known that I, GEORGE W. THISSELL, of Winters, county of Yolo, State of California, have invented an Improved Coddling-Moth Trap and Tree-Protector; and I hereby declare the following to be a full, clear, and exact description thereof.

My invention relates to a device for protecting trees from the ravages of the coddling-moth and other destructive insects; and it consists of a table encircling the trunk of the tree at the ground, and having a downwardly-projecting edge which enters the ground, so that the approaching insects will be forced to pass over the table. Around the inside of the table is fixed an annular chamber, which may be filled with cotton or any other suitable substance, into which the insects may crawl. A veil is fixed around the outer edge of this chamber, so that its lower edge will rest upon the table at an angle which will allow the insects to pass inward beneath it and get into the chamber, but prevents their escape.

Referring to the accompanying drawings for a more complete explanation of my invention, Figure 1 is a perspective view of my apparatus. Fig. 2 is a sectional view of the same.

A is a table, of metal or of any suitable material, made large enough to encircle the tree or shrub which is to be protected. This table has a flange, B, extending downward from its outer edge, and this flange is pressed into the earth around the tree, so as to prevent any insect from passing beneath it. A wall, C, projects upward from the inner edge of the table, and a chamber, D, is formed outside of this wall, as shown, extending around the tree above the table. The outer edge, E, of this chamber is at some little height above the table, and a veil, F, is hinged or otherwise fixed to this edge, with its lower or free edge, G, inclining inward, so as to rest upon the table. This veil may be made in many different ways. One is to form it of narrow strips of light sheet metal or other substance, and hinge these strips at E, so that their free edges will rest lightly upon the table and can be easily raised by an approaching insect, which will thus obtain access to the interior of the chamber. The strips or flaps, falling behind it, will prevent any egress in the same direction. This veil might also be made of wire, bristles, hair-cloth, duck, or other cloth of sufficient stiffness, or of netting, through or beneath which the insects might enter, but which would prevent any return. The interior of the chamber is filled with cotton or any suitable substance, within which the moth or other insect may lay its eggs or build its nest; but the veil will effectually prevent any escape from the chamber.

This apparatus is especially useful in protecting trees from the ravages of what is known as the "coddling-moth." The flange B, sunk in the earth, will prevent the insects passing beneath the table A, and they will therefore crawl upon the table, and when they reach the veil it will yield to any slight effort and allow them to pass beneath, but, falling behind them, will effectually prevent their escape.

This device may be set in place in the spring and remain without further attention until the fall, when it may be removed for cleaning.

Having thus described my invention, what I claim as new, and desire to secure by Letters Patent, is—

1. The table A, formed to surround a tree or shrub, and having the flange B around its periphery to enter the earth, in combination with a chamber, D, upon the inner part of the table, and into which the insects may be received, substantially as herein described.

2. The flanged table A, surrounding a tree or shrub, and having the annular chamber D upon it, in combination with the inclined veil or flexible flap F, fixed to the chamber, and having its free edge resting upon the table, substantially as and for the purpose herein described.

3. A device for protecting trees from insects, consisting of a table, A, surrounding the tree, and having an exterior flange, B, entering the earth, an annular chamber, D, to receive the insects, and a flexible veil or wall, F, beneath or through which the insects may pass, substantially as herein described.

In witness whereof I have hereunto set my hand.

GEORGE W. THISSELL.

Witnesses:
S. H. NOURSE,
G. W. EMERSON.